(12) United States Patent
Groninga et al.

(10) Patent No.: US 10,494,095 B2
(45) Date of Patent: Dec. 3, 2019

(54) HYBRID POWERED UNMANNED AIRCRAFT SYSTEM

(71) Applicant: Bell Helicopter Textron Inc., Fort Worth, TX (US)

(72) Inventors: Kirk Landon Groninga, Fort Worth, TX (US); Daniel Bryan Robertson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 314 days.

(21) Appl. No.: 15/680,501

(22) Filed: Aug. 18, 2017

(65) Prior Publication Data

US 2019/0055016 A1 Feb. 21, 2019

(51) Int. Cl.
*B64C 27/18* (2006.01)
*B64C 27/24* (2006.01)
(Continued)

(52) U.S. Cl.
CPC .......... *B64C 39/024* (2013.01); *B64C 27/02* (2013.01); *B64C 27/024* (2013.01); *B64C 27/18* (2013.01);
(Continued)

(58) Field of Classification Search
CPC ..... B64C 39/024; B64C 39/02; B64C 27/024; B64C 27/18; B64C 27/82; B64C 27/02;
(Continued)

(56) References Cited

U.S. PATENT DOCUMENTS 2,696,267 A * 12/1954 Mouravieff ............. B64C 27/18
416/22
2,814,349 A * 11/1957 Berry ...................... B64C 27/18
416/21
(Continued)

FOREIGN PATENT DOCUMENTS

GB 627117 A 7/1949

OTHER PUBLICATIONS

European Exam Report, Application No. EP17195818.4, European Patent Office, dated Jan. 31, 2018.
(Continued)

*Primary Examiner* — Tien Q Dinh
*Assistant Examiner* — Arfan Y Sinaki
(74) *Attorney, Agent, or Firm* — Lawrence Youst PLLC

(57) ABSTRACT

An unmanned aircraft system has a vertical takeoff and landing flight mode and a forward flight mode. The unmanned aircraft system includes an airframe, a rotor assembly rotatably coupled to the airframe and a propeller rotatably coupled to the airframe. The rotor assembly including at least two rotor blades having tip jets that are operably associated with a compressed gas power system. The propeller is operably associated with an electric power system. In the vertical takeoff and landing flight mode, compressed gas from the compressed gas power system is discharged through the tip jets to rotate the rotor assembly and generate vertical lift. In the forward flight mode, the electric power system drives the propeller to generate forward thrust and autorotation of the rotor assembly generates vertical lift.

20 Claims, 6 Drawing Sheets

(51) Int. Cl.
  B64C 39/02 (2006.01)
  B64C 27/82 (2006.01)
  B64C 27/02 (2006.01)
  B64D 47/08 (2006.01)
  B64D 27/24 (2006.01)
  G01S 19/13 (2010.01)
  B64C 27/37 (2006.01)

(52) U.S. Cl.
  CPC .............. B64C 27/82 (2013.01); B64D 27/24 (2013.01); B64D 47/08 (2013.01); B64C 27/37 (2013.01); B64C 2027/8209 (2013.01); B64C 2027/8236 (2013.01); B64C 2201/024 (2013.01); B64C 2201/042 (2013.01); B64C 2201/108 (2013.01); B64C 2201/141 (2013.01); G01S 19/13 (2013.01)

(58) Field of Classification Search
  CPC .............. B64C 27/37; B64C 2201/162; B64C 2201/146; B64C 2201/04; B64C 2201/108; B64C 2201/141; B64C 2201/024; B64C 2201/042; B64D 47/08; B64D 2027/026; B64D 2027/8236; B64D 2027/8209; B64D 27/02; B64D 27/24; G01S 19/13
  USPC .......................................... 244/17.11, 56, 57
  See application file for complete search history.

(56) References Cited

U.S. PATENT DOCUMENTS

| | | | | |
|---|---|---|---|---|
| 2,954,186 A * | 9/1960 | Bilbrey | ................. | B64C 27/022 244/17.19 |
| 3,558,082 A * | 1/1971 | Bennie | ................. | B64C 27/18 244/17.25 |
| 3,610,821 A * | 10/1971 | Narbaits-Jaureguy | | G05D 1/0676 348/117 |
| 3,886,306 A * | 5/1975 | Fayard | ................. | B64D 47/08 348/117 |
| 4,589,611 A * | 5/1986 | Ramme | ................. | B64C 27/10 244/12.3 |
| 5,738,301 A * | 4/1998 | Francois | ................. | B64C 27/26 244/17.19 |
| 5,791,592 A * | 8/1998 | Nolan | ................. | B64C 27/14 244/17.11 |
| 7,104,499 B1 * | 9/2006 | Arata | ................. | B64C 9/38 244/12.3 |
| 7,448,571 B1 * | 11/2008 | Carter, Jr. | ................. | B64C 27/02 244/17.11 |
| 8,376,266 B2 * | 2/2013 | Gemmati | ................. | B64C 27/22 244/17.11 |
| 8,882,024 B1 * | 11/2014 | McCollough | ................. | B64C 27/82 244/17.19 |
| 8,931,731 B2 * | 1/2015 | Yarger | ................. | B64C 27/025 244/17.11 |
| 8,939,394 B1 * | 1/2015 | Sonneborn | ................. | B64C 27/26 244/17.11 |
| 8,960,594 B2 * | 2/2015 | Groen | ................. | B64C 27/025 244/17.11 |
| 9,145,831 B1 * | 9/2015 | White | ................. | F02C 7/08 |
| 9,174,730 B2 * | 11/2015 | Litwinowicz | ................. | B64C 27/82 |
| 9,266,607 B2 * | 2/2016 | Fink | ................. | B64C 27/26 |
| 9,499,253 B1 * | 11/2016 | White | ................. | B32B 1/00 |
| 9,527,577 B2 * | 12/2016 | Embacher | ................. | B64C 5/16 |
| 9,611,037 B1 * | 4/2017 | Groen | ................. | B64C 27/82 |
| 2011/0036954 A1 * | 2/2011 | Piasecki | ................. | B64C 3/385 244/7 A |
| 2012/0199692 A1 * | 8/2012 | van der Westhuizen | | B64C 27/00 244/17.25 |
| 2015/0367934 A1 * | 12/2015 | White | ................. | B64C 27/18 244/17.11 |
| 2016/0023751 A1 | 1/2016 | Lee et al. | | |
| 2016/0244158 A1 * | 8/2016 | Fredericks | ................. | B64C 25/52 |
| 2016/0297520 A1 * | 10/2016 | Sada-Salinas | ................. | B64C 29/0025 |
| 2017/0066539 A1 * | 3/2017 | van der Westhuizen | | B64D 27/24 |
| 2018/0340554 A1 * | 11/2018 | Hutchison | ................. | B64C 13/42 |
| 2019/0036732 A1 * | 1/2019 | Dormiani | ................. | B64C 39/024 |

OTHER PUBLICATIONS

European Search Report, Application No. 17193024.1, European Patent Office, dated Dec. 7, 2017.

Lin, et. al., Dynamics, Stability and Control Characteristics of Unmanned Compound Autogyro; IEEE Chinese Guidance, Navigation and Control Conference; Nanjing, China; Aug. 12-14, 2016.

* cited by examiner

HYBRID POWERED UNMANNED AIRCRAFT SYSTEM

TECHNICAL FIELD OF THE DISCLOSURE

The present disclosure relates, in general, to aircraft having a forward flight mode and a vertical takeoff and landing flight mode and, in particular, to a hybrid powered unmanned aircraft system utilizing a compressed gas power system for vertical lift and an electric power system for forward thrust.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. UAS may be used in military, commercial, scientific, recreational and other applications. For example, military applications may include intelligence, surveillance and reconnaissance missions as well as attack missions. Civil applications may include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Recently, military organizations have indicated a desire for small unmanned aircraft systems that are operable as soldier borne sensors (SBS). Such soldier borne sensors should be easy to transport without putting a weight burden on the soldier and simple to deploy yet be capable of continuous flight during certain adverse conditions for minutes or hours. In addition, such soldier borne sensors should be capable of remote and/or autonomous flight in an operating theater of hundreds or thousands of meters including visual line of sight operations. Further, such soldier borne sensors should be capable of providing real-time information relevant to the area immediately surrounding the soldiers, enabling the soldiers to assess and respond to the most eminent threat and/or rapidly changing threats.

SUMMARY

In a first aspect, the present disclosure is directed to an unmanned aircraft system having a vertical takeoff and landing flight mode and a forward flight mode. The unmanned aircraft system includes an airframe, a rotor assembly that is rotatably coupled to the airframe and a propeller that is rotatably coupled to the airframe. The rotor assembly includes at least two rotor blades having tip jets. A compressed gas power system is operably associated with the tip jets and an electric power system is operably associated with the propeller such that, in the vertical takeoff and landing flight mode, compressed gas from the compressed gas power system is discharged through the tip jets to rotate the rotor assembly to generate vertical lift and, in the forward flight mode, the electric power system drives the propeller to generate forward thrust and autorotation of the rotor assembly generates vertical lift.

In certain embodiments, the rotor assembly may have a gimballing degree of freedom. In some embodiments, the rotor assembly may have a free spinning degree of freedom and/or a tilting degree of freedom to support autorotation in the forward flight mode. In certain embodiments, each rotor blade of the rotor assembly may have a tip jet. In some embodiments, the compressed gas power system may include a compressed gas canister and a valve for selectively releasing the compressed gas from the compressed gas canister. In such embodiments, the compressed gas canister may be a line replaceable unit. In certain embodiments, the compressed gas power system may be a compressed carbon dioxide power system.

In certain embodiments, the propeller may be a pusher propeller. In some embodiments, the electric power system may include a battery system and an electric motor. In certain embodiments, a flight control system may be operable to control the compressed gas power system and the electric power system. In such embodiments, the flight control system may be operable for autonomous control of the unmanned aircraft system using GPS waypoint navigation. Additionally or alternatively, the flight control system may be operable to communicate with a remote station for assisted manual navigation. In some embodiments, the unmanned aircraft system may includes a sensor system incorporating, for example, one or more of an optical camera, a thermal camera, an infrared camera, a video camera, an intelligence, surveillance and reconnaissance payload and a GPS system.

In a second aspect, the present disclosure is directed to an unmanned aircraft system having a vertical takeoff and landing flight mode and a forward flight mode. The unmanned aircraft system includes an airframe, a rotor assembly that is rotatably coupled to the airframe and a propeller that is rotatably coupled to the airframe. The rotor assembly includes at least two rotor blades having tip jets. A compressed gas power system is operably associated with the tip jets and an electric power system is operably associated with the propeller. A flight control system is operable to control the compressed gas power system and the electric power system. A sensor system is carried by the airframe. In the vertical takeoff and landing flight mode, compressed gas from the compressed gas power system is discharged through the tip jets to rotate the rotor assembly to generate vertical lift. In the forward flight mode, the electric power system drives the propeller to generate forward thrust and autorotation of the rotor assembly generates vertical lift.

In some embodiments, the compressed gas power system may include a compressed gas canister and a valve for selectively releasing the compressed gas from the compressed gas canister and the electric power system may include a battery system and an electric motor. In certain embodiments, the flight control system may be operable for one or both of autonomous control of the unmanned aircraft system using GPS waypoint navigation and communications with a remote station for assisted manual navigation.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1B:
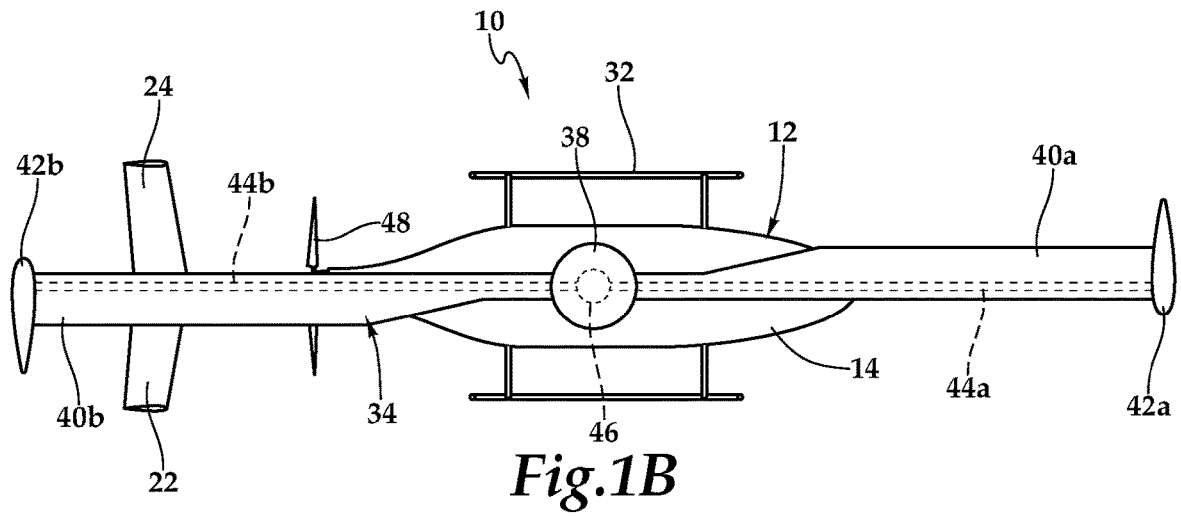
FIGS. 1A-1E are schematic illustrations of a hybrid powered unmanned aircraft system in accordance with embodiments of the present disclosure.
Figure 1A:
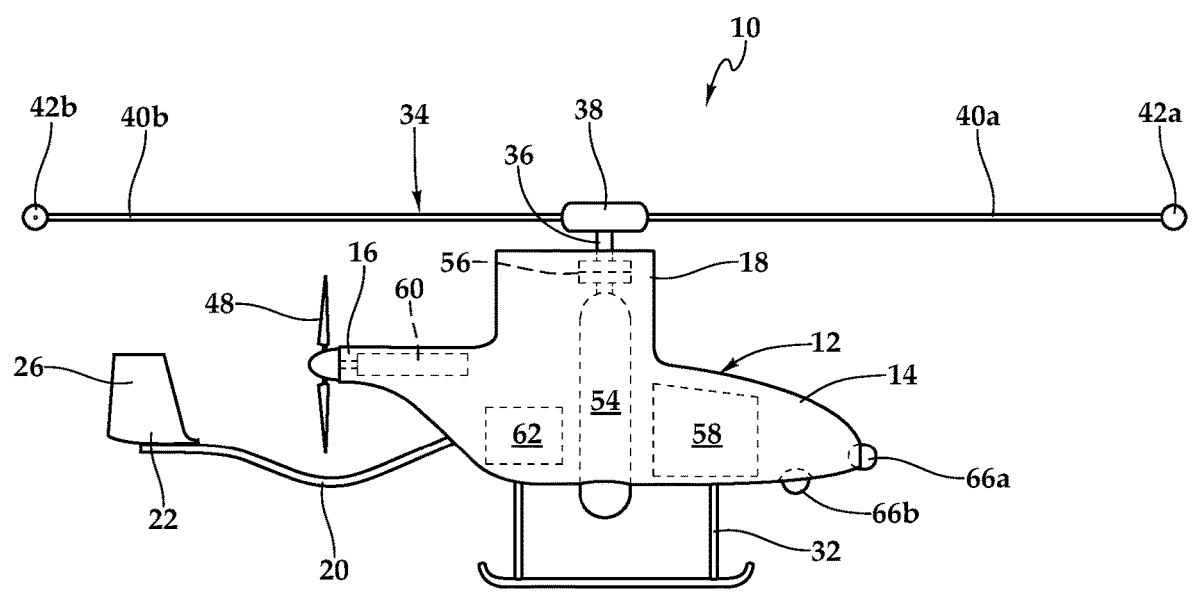
Figure 1D:
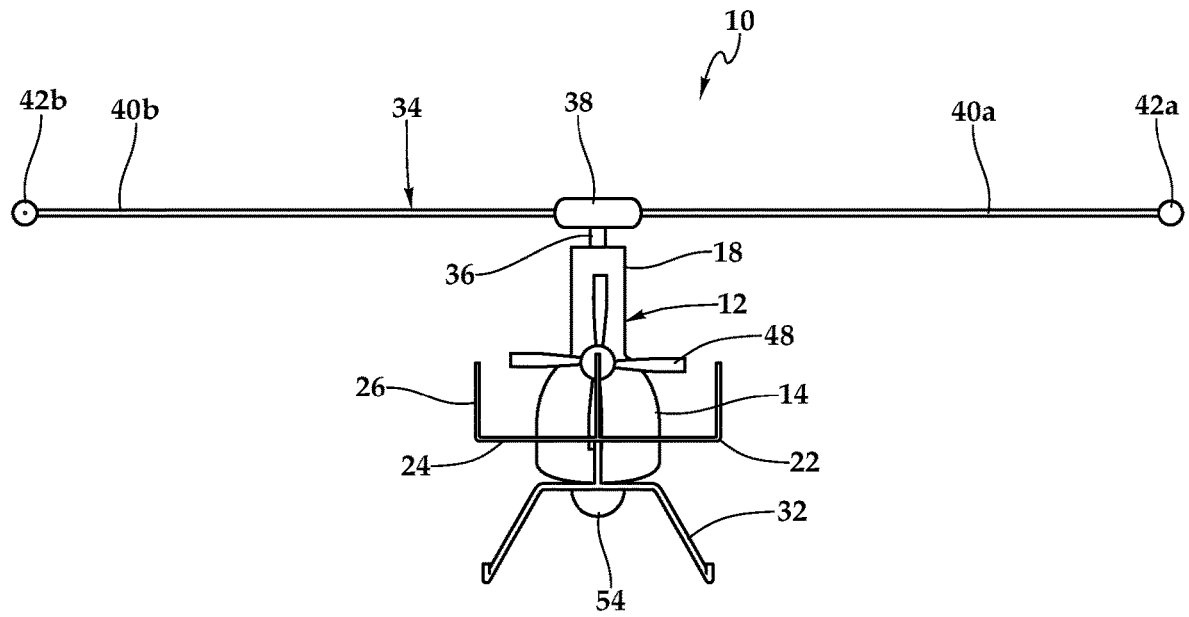
Figure 1C:
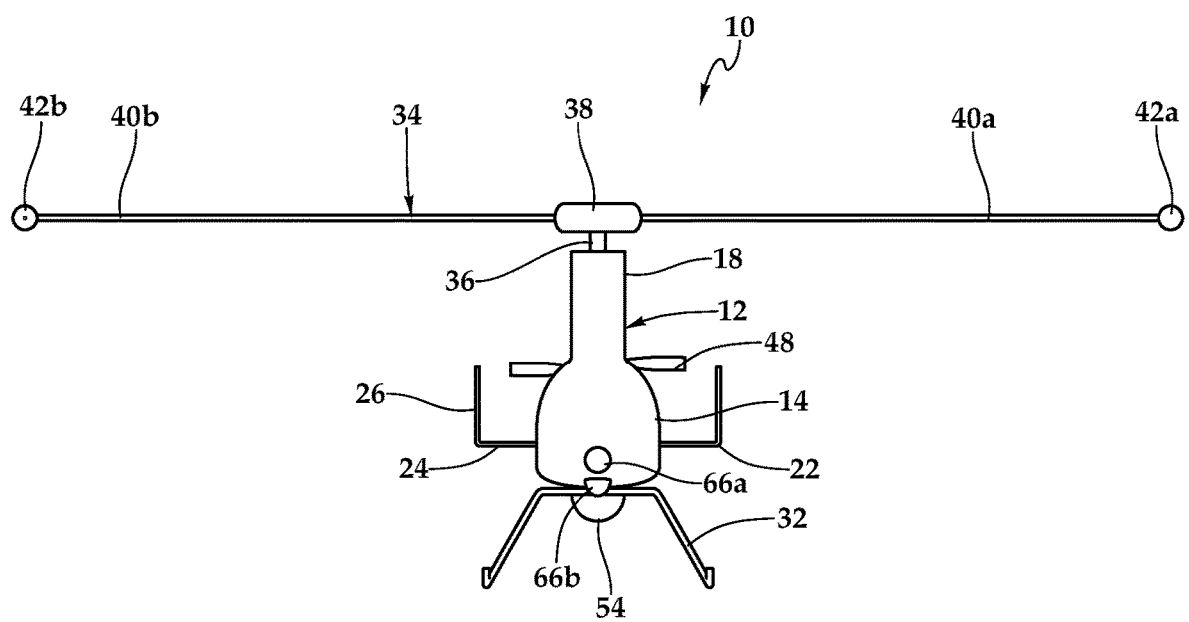
Figure 1E:
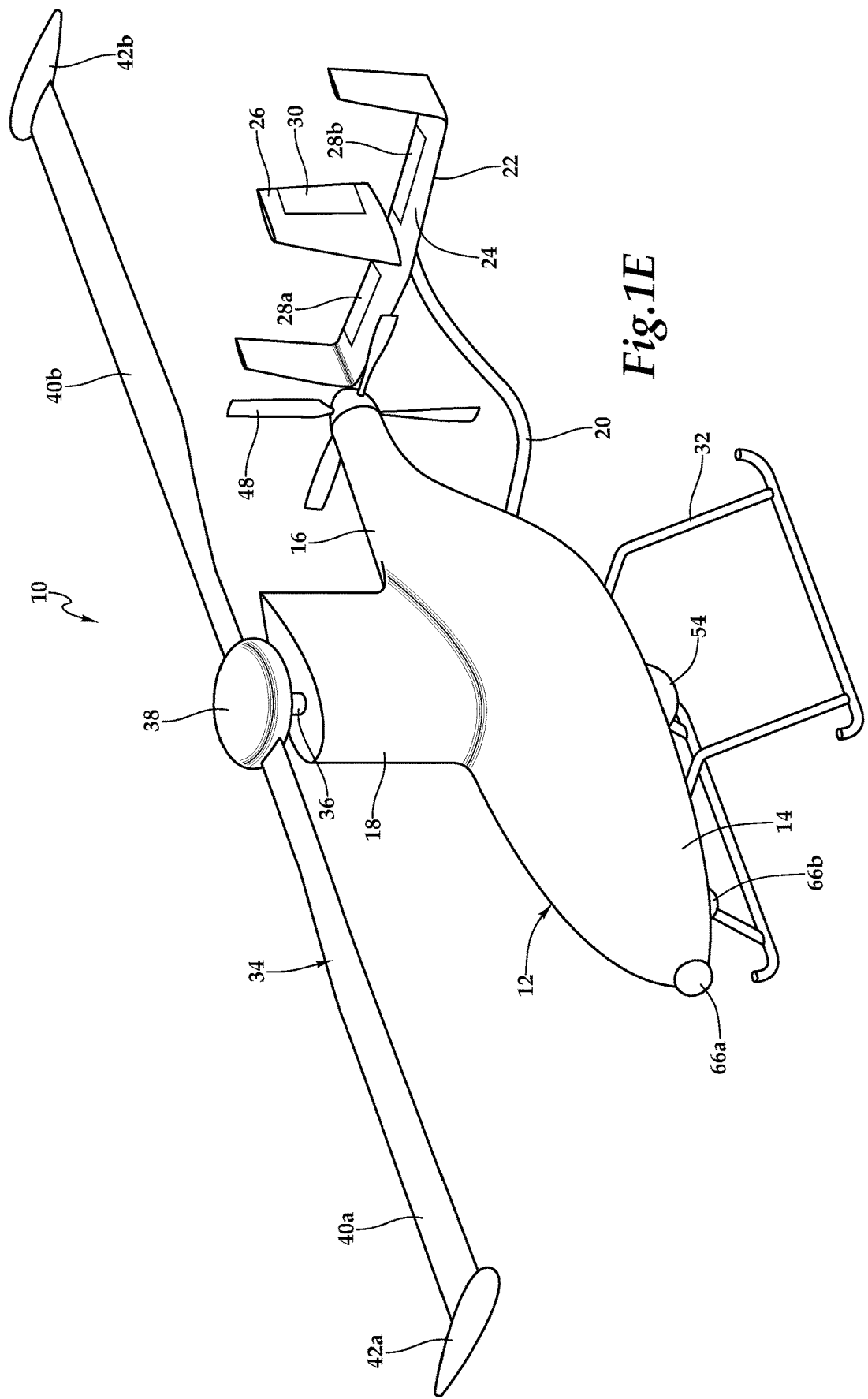
Figure 2:
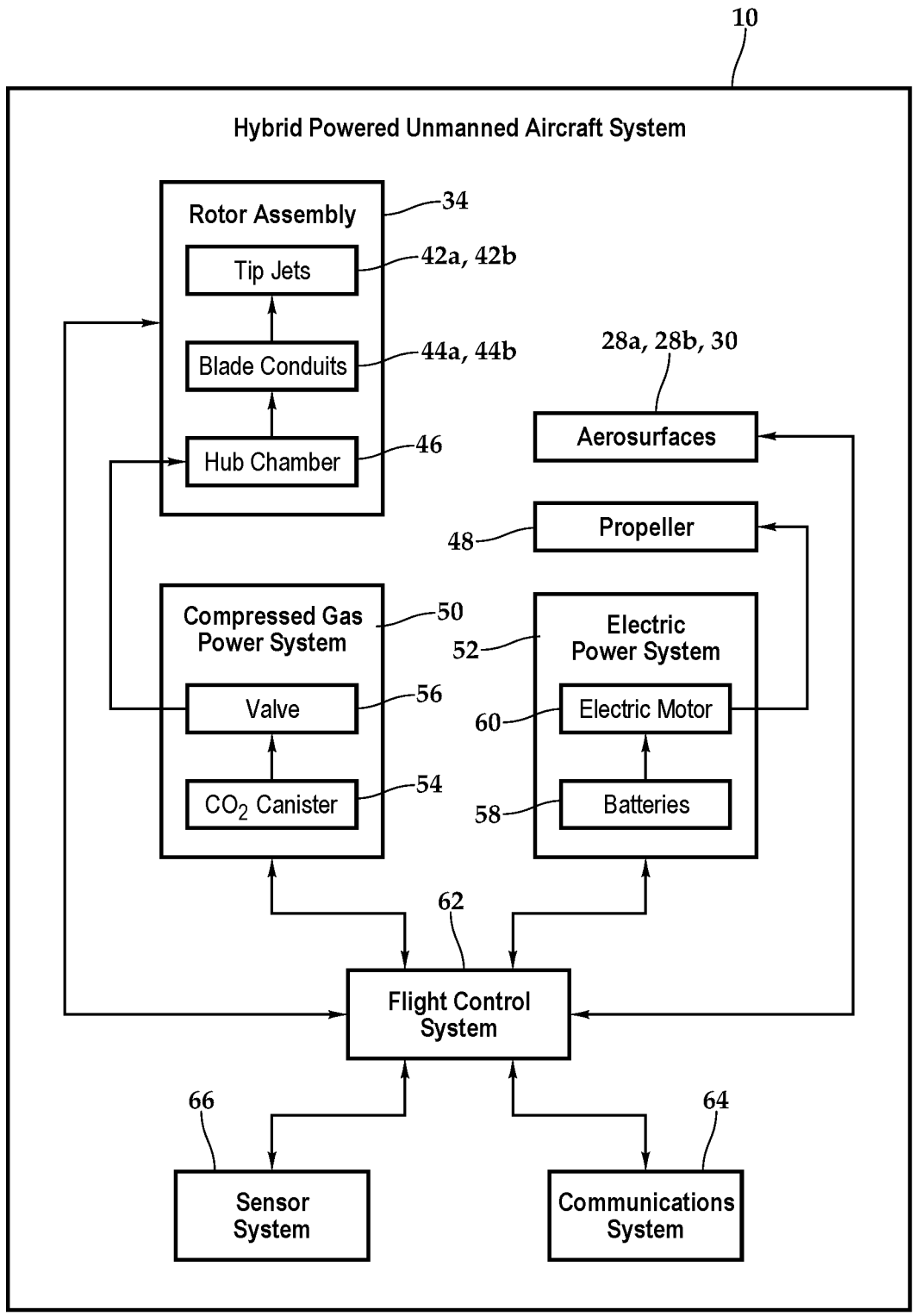
FIG. 2 is a block diagram of various mechanical systems of a hybrid powered unmanned aircraft system in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Referring to FIGS. 1A-1E and 2 in the drawings, a hybrid powered unmanned aircraft system referred to herein as aircraft 10 is depicted. Aircraft 10 may be a small unmanned aircraft system or mini unmanned aircraft system suitable for use as a soldier borne sensor. In the illustrated embodiment, aircraft 10 has an airframe 12 including a fuselage 14, an aft boom 16 and an upper fairing 18. Airframe 12 may be formed from a light-weight, high-strength material such as plastics including expanded polystyrene (EPS) foam, metals including aluminum or composites including fiberglass fabric, carbon fabric, fiberglass tape, carbon tape and combinations thereof that may be formed by curing together a plurality of material layers. Extending aft of fuselage 14 is a tailboom 20 that supports an empennage 22 depicted as a triple tail having a horizontal stabilizer 24 and a vertical stabilizer 26 including three vertical fins. In the illustrated embodiment, horizontal stabilizer 24 includes two active aerosurfaces depicted as elevators 28a, 28b and vertical stabilizer 26 includes an active aerosurface depicted as rudder 30 that aid in pitch and yaw stability during the forward flight of aircraft 10. In other embodiments, empennage 22 may be a T tail, a V tail, a conventional tail, a cruciform tail, a dual tail or other suitable tail including or excluding active aerosurfaces. Extending below fuselage 14 are landing skids 32, which are optional on aircraft 10.

Aircraft 10 includes a rotor assembly 34 that is rotatably coupled to airframe 12 about a nonrotating mast 36 that provides vertical lift for aircraft 10. Rotor assembly 34 includes a rotor hub 38 and two rotor blades 40a, 40b. Rotor blade 40a includes a tip jet 42a and rotor blade 40b includes a tip jet 42b. In the illustrated embodiment, tip jets 42a, 42b are cold cycle pressure jets or rotor blade nozzles that provide thrust responsive to the discharge of a compressed gas such as carbon dioxide. In other embodiments, each tip jet 42a, 42b could include a combustion chamber in which an air and fuel mixture is ignited to provide thrust. As best seen in FIG. 1B, rotor blade 40a includes a blade conduit 44a and rotor blade 40b includes a blade conduit 44b that may be integral passageways within rotor blades 40a, 40b or discrete component positioned within rotor blades 40a, 40b. Blade conduits 44a, 44b are in fluid communication with a hub chamber 46 within rotor hub 38 and provide fluid paths to tip jets 42a, 42b. Rotor assembly 34 preferably has a gimballing degree of freedom allowing rotor assembly 34 to teeter during VTOL operations. In addition, rotor assembly 34 has a free spinning degree of freedom and a tilting degree of freedom allowing rotor assembly 34 to engage in autorotation during forward flight operations, thus providing lift for aircraft 10 in forward flight mode.

Aircraft 10 includes a propeller depicted as pusher propeller 48 that provides forward thrust for aircraft 10. Aircraft 10 is powered by a hybrid power system including a compressed gas power system 50 and an electric power system 52. In the illustrated embodiment, compressed gas power system 50 includes a compressed gas canister 54 depicted as a carbon dioxide cartridge. Compressed gas canister 54 may be an 8-gram canister, a 12-gram canister, a 16-gram canister or a canister having other suitable weight. Compressed gas power system 50 also includes a valve 56 operable to selectively release compressed gas from compressed gas canister 54 into a passageway within mast 36, which is in fluid communication with hub chamber 46. Electric power system 52 includes one or more batteries 58 and an electric motor 60 that is coupled to propeller 48 by a drive shaft or other suitable connection. Preferably, compressed gas canister 54 and batteries 58 are line replaceable units such that after completion of one or more missions, compressed gas canister 54 and/or batteries 58 can be easily removed and replaced in the field to refuel aircraft 10 in preparation for the next mission.

In the illustrated embodiment, aircraft 10 has a flight control system 62 that is housed within fuselage 14. Flight control system 62, such as a digital flight control system, preferably includes non-transitory computer readable storage media including a set of computer instructions executable by one or more processors for controlling the operation of aircraft 10. Flight control system 62 may be implemented on one or more general-purpose computers, special purpose computers or other machines with memory and processing capability. For example, flight control system 62 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 62 may be a microprocessor-based system operable to execute program code in the form of machine-executable instructions. In addition, flight control system 62 may be selectively connectable to other computer systems via a suitable communication network that may include both wired and wireless connections.

Flight control system 62 communicates with compressed gas power system 50 and electric power system 52 to provide propulsion to aircraft 10. For example, when it is desired to launch aircraft 10, flight control system 62 sends commands to valve 56 to open allowing compressed gas from compressed gas canister 54 to be discharged through tip jets 42a, 42b via blade conduits 44a, 44b, hub chamber 46 and the mast passageway. The discharge of compressed gas through tip jets 42a, 42b causes rotor assembly 34 to rotate generating vertical lift such that aircraft 10 can take off, hover and climb to a desired altitude. After vertical assent to the desired elevation, aircraft 10 may begin the transition from vertical takeoff to forward flight. Flight control system 62 transitions aircraft 10 from vertical takeoff and landing flight mode to forward flight mode by sending commands to electric motor 60 to commence operations causing rotation of propeller 48 generating forward thrust. Flight control system 62 also sends commands to valve 56 to close, thus stopping the thrust output from tip jets 42a, 42b. In addition, flight control system 62 may send commands to rotor assembly 34 to tilt in an aftward direction to create a preferred angle of attack for rotor blades 40a, 40b such that aerodynamic forces during forward flight are operable to cause autorotation of rotor assembly 34, which provides vertical lift for aircraft 10 during forward flight operations.

Flight control system 62 of aircraft 10 may be operated responsive to autonomous flight control, remote flight control or a combination thereof. For example, flight control system 62 may use waypoint navigation to follow a trail of preprogramed waypoints to accomplish a desired mission. Alternatively or additionally, flight control system 62 may be operated responsive to assisted manual flight based upon commands received from a ground station via a communication system 64 using a wireless communications protocol. During assisted manual flight, aircraft 10 may be limited to flight within a line of sight communications range.

In the illustrated embodiment, aircraft 10 includes a sensor system 66 that is controlled by flight control system 62. In other embodiments, sensor system 66 may utilize an independent control system. Sensor system 66 may include a sensor array having one or more of an optical camera, a thermal camera, an infrared camera, a video camera, an intelligence, surveillance and reconnaissance payload, a GPS system and other desired sensors. In the illustrated embodiment, sensor system 66 includes a forward pointing camera 66a and a downward pointing camera 66b. Sensor system 66 may provide real time images and/or video to the ground station via communication system 64 using a wireless communications protocol, which may be useful when aircraft 10 is operated as a soldier borne sensor.

When the mission of aircraft 10 is complete, flight control system 62 transitions aircraft 10 from forward flight mode to vertical takeoff and landing flight mode by sending commands to electric motor 60 to reduce the speed of and/or stop the rotation of propeller 48. In addition, flight control system 62 sends commands to rotor assembly 34 to tilt forward and sends commands to valve 56 to open allowing compressed gas from compressed gas canister 54 to be discharged through tip jets 42a, 42b to rotate rotor assembly 34 and generate vertical lift. Once aircraft 10 has completed the transition to vertical takeoff and landing flight mode, aircraft 10 may commence its vertical descent to a landing surface at the desired location.

Figure 3:
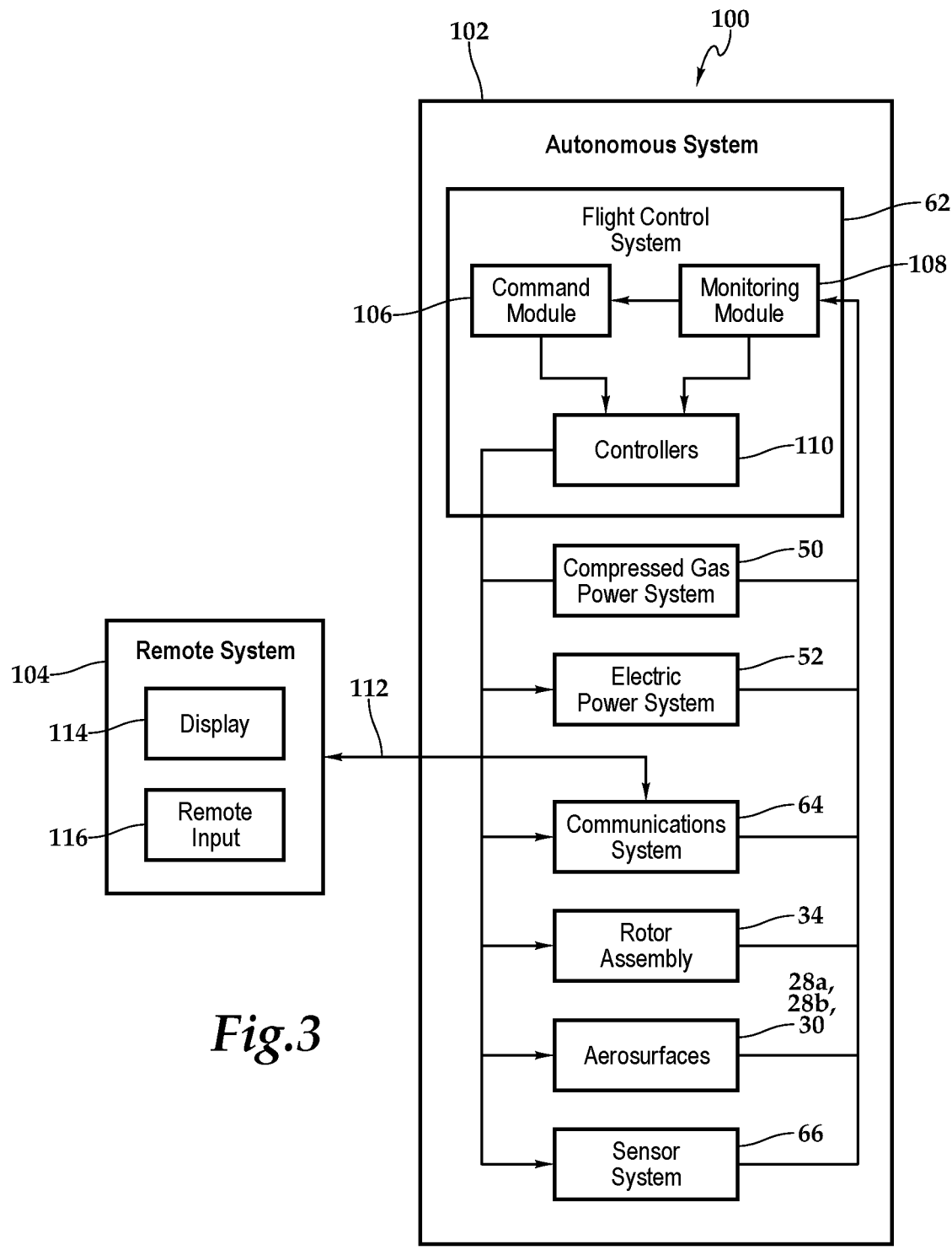
FIG. 3 is a block diagram of control systems for a hybrid powered unmanned aircraft system in accordance with embodiments of the present disclosure.

Referring additionally to FIG. 3 in the drawings, a block diagram depicts an aircraft control system 100 operable for use with aircraft 10 of the present disclosure. In the illustrated embodiment, system 100 includes two primary computer based subsystems; namely, an autonomous system 102 and a remote system 104. As discussed herein, the aircraft of the present disclosure may be operated autonomously responsive to commands generated by flight control system 62. In the illustrated embodiment, flight control system 62 includes a command module 106, a monitoring module 108 and controllers 110. It is to be understood by those skilled in the art that these and other modules executed by flight control system 62 may be implemented in a variety of forms including hardware, software, firmware, special purpose processors and combinations thereof.

During the various operating modes of aircraft 10 including vertical takeoff and landing flight mode, hover flight mode, forward flight mode and transitions therebetween, command module 106 provides commands to controllers 110. For example, these commands enable operation of compressed gas power system 50 and electric power system 52 providing vertical lift and forward thrust to aircraft 10. Flight control system 62 receives feedback from compressed gas power system 50, electric power system 52, communications system 64, rotor assembly 34 and aerosurfaces 28a, 28b, 30. This feedback is processes by monitoring module 108 that can supply correction data and other information to command module 106 and/or controllers 110. Sensor system 66 may include positioning sensors, attitude sensors, speed sensors, environmental sensors, fuel sensors, temperature sensors, location sensors and the like that provide additional information to monitoring module 108 to further enhance autonomous control capabilities.

Some or all of the autonomous control capability of flight control system 62 can be augmented or supplanted by remote flight control system 104. Remote system 104 may include one or computing systems that may be implemented on general-purpose computers, special purpose computers or other machines with memory and processing capability including, for example, a tablet computer. The computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 104 communicates with flight control system 62 via communications system 64 over a communication link 112 that may include both wired and wireless connections.

Remote system 104 preferably includes one or more display devices 114 configured to display information relating to or obtained by one or more aircraft of the present disclosure. Remote system 104 may also include audio output and input devices such as a microphone, speakers and/or an audio port allowing an operator to communicate with, for example, other remote station operators. Display device 114 may also serve as a remote input device 116 if a touch screen display implementation is used, however, other remote input devices, such as a keyboard or joysticks, may alternatively be used to allow an operator to provide control commands to aircraft 10.

Figure 4:
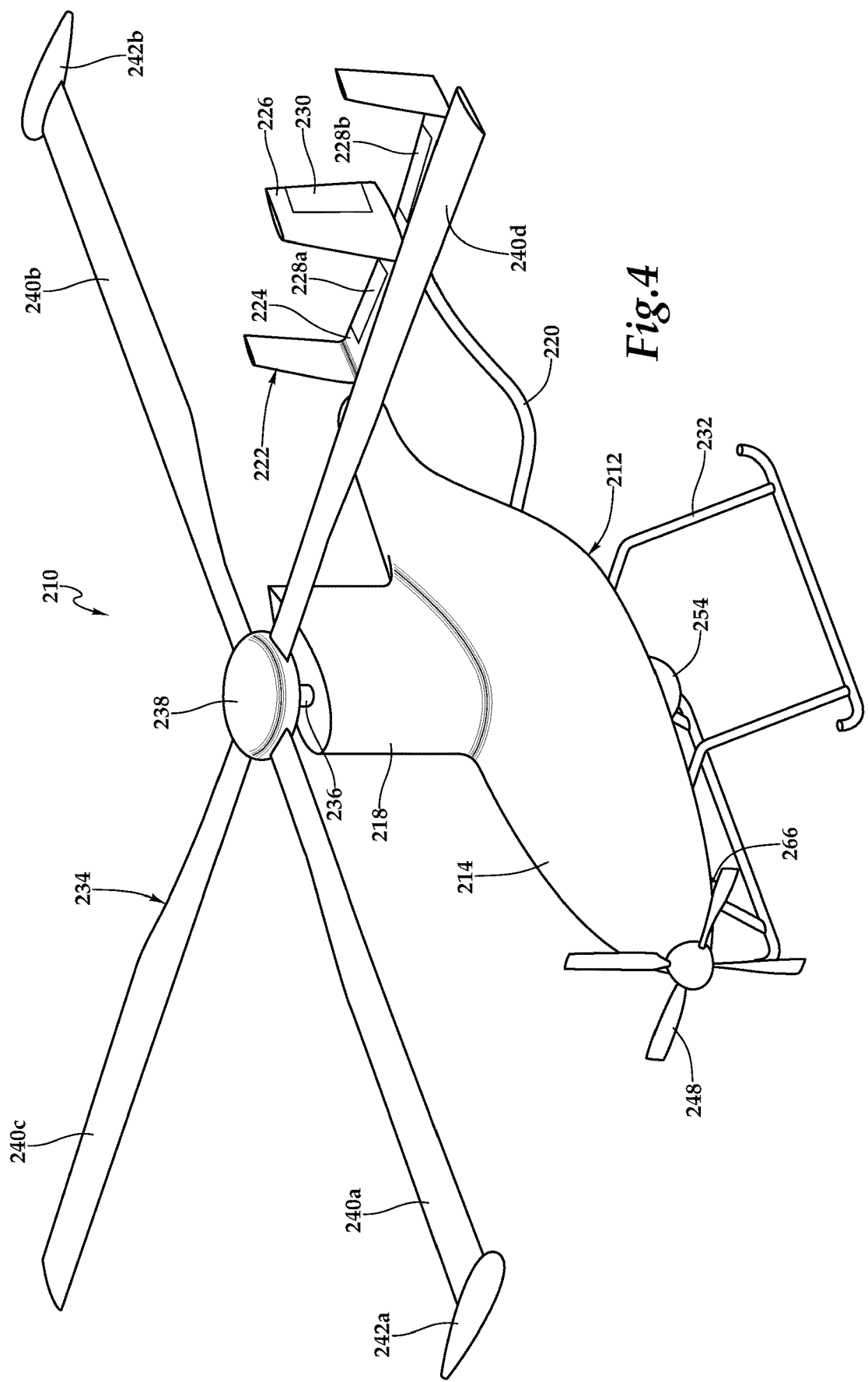
FIG. 4 is schematic illustrations of a hybrid powered unmanned aircraft system in accordance with embodiments of the present disclosure.

Referring to FIG. 4 in the drawings, a hybrid powered unmanned aircraft system referred to herein as aircraft 210 is depicted. Aircraft 210 may be a small unmanned aircraft system or mini unmanned aircraft system suitable for use as a soldier borne sensor. In the illustrated embodiment, aircraft 210 has an airframe 212 including a fuselage 214 and an upper fairing 218. Airframe 212 may be formed from a light-weight, high-strength material such as those described with reference to airframe 12. Extending aft of fuselage 214 is a tailboom 220 that supports an empennage 222 depicted as a triple tail having a horizontal stabilizer 224 and a vertical stabilizer 226 including three vertical fins. In the illustrated embodiment, horizontal stabilizer 224 includes two active aerosurfaces depicted as elevators 228*a*, 228*b* and vertical stabilizer 226 includes an active aerosurface depicted as rudder 230 that aid in pitch and yaw stability during the forward flight of aircraft 10. Extending below fuselage 214 are landing skids 232, which are optional on aircraft 210.

Aircraft 210 includes a rotor assembly 234 that is rotatably coupled to airframe 212 about a nonrotating mast 236 that provides vertical lift for aircraft 210. Rotor assembly 234 includes a rotor hub 238 and four rotor blades 240*a*, 240*b*, 240*c*, 240*d*, two of which include tip jets. Specifically, rotor blade 240*a* includes a tip jet 242*a* and rotor blade 240*b* includes a tip jet 242*b* which are cold cycle pressure jets or rotor blade nozzles that provide thrust responsive to the discharge of a compressed gas such as carbon dioxide. Similar to aircraft 10 but not visible in FIG. 4, rotor blades 240*a*, 240*b* includes blade conduits that are in fluid communication with a hub chamber that provide fluid paths to tip jets 242*a*, 242*b*. Rotor assembly 234 preferably has a gimballing degree of freedom allowing rotor assembly 234 to teeter during VTOL operations. In addition, rotor assembly 234 has a free spinning degree of freedom and a tilting degree of freedom allowing rotor assembly 234 to engage in autorotation during forward flight operations, thus providing lift for aircraft 210 in forward flight mode.

Aircraft 210 includes a propeller 248 rotatably coupled to the nose of fuselage 214 that provides forward thrust for aircraft 210. Aircraft 210 is powered by a hybrid power system including a compressed gas power system and an electric power system similar to aircraft 10. The compressed gas power system includes a compressed gas canister 254 depicted as a carbon dioxide canister and a valve operable to selectively release compressed gas from compressed gas canister 254 for operation tip jets 242*a*, 242*b*. The electric power system includes one or more batteries and an electric motor that is coupled to propeller 248 by a drive shaft or other suitable connection.

Aircraft 210 includes a flight control system that communicates with the compressed gas power system and the electric power system to provide propulsion to aircraft 210. The flight control system may be operated responsive to autonomous flight control, remote flight control or a combination thereof. For example, the flight control system may use waypoint navigation to follow a trail of preprogramed waypoints to accomplish a desired mission. Alternatively or additionally, the flight control system may be operated responsive to assisted manual flight based upon commands received from a ground station via a communication system using a wireless communications protocol. In the illustrated embodiment, aircraft 210 includes a sensor system 266 that may include a sensor array having one or more of an optical camera, a thermal camera, an infrared camera, a video camera, an intelligence, surveillance and reconnaissance payload, a GPS system and other desired sensors. Sensor system 266 may provide real time images and/or video to the ground station via the communication system using a wireless communications protocol, which may be useful when aircraft 210 is operated as a soldier borne sensor.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An unmanned aircraft system having a vertical takeoff and landing flight mode and a forward flight mode, the unmanned aircraft system comprising:
    an airframe;
    a rotor assembly including at least two rotor blades having tip jets, the rotor assembly rotatably coupled to the airframe;
    a compressed gas power system operably associated with the tip jets, the compressed gas power system including a compressed gas canister and a valve for selectively releasing the compressed gas from the compressed gas canister;
    a propeller rotatably coupled to the airframe; and
    an electric power system operably associated with the propeller;
    wherein, in the vertical takeoff and landing flight mode, compressed gas from the compressed gas power system is discharged through the tip jets to rotate the rotor assembly to generate vertical lift; and
    wherein, in the forward flight mode, the electric power system drives the propeller to generate forward thrust and autorotation of the rotor assembly generates vertical lift.

2. The unmanned aircraft system as recited in claim 1 wherein the rotor assembly further comprises a gimballing rotor assembly.

3. The unmanned aircraft system as recited in claim 1 wherein the rotor assembly further comprises a free spinning degree of freedom to support autorotation in the forward flight mode.

4. The unmanned aircraft system as recited in claim 1 wherein the rotor assembly further comprises a tilting degree of freedom to support autorotation in the forward flight mode.

5. The unmanned aircraft system as recited in claim 1 wherein each rotor blade of the rotor assembly has a tip jet.

6. The unmanned aircraft system as recited in claim 1 wherein the compressed gas canister further comprises a line replaceable unit.

7. The unmanned aircraft system as recited in claim 1 wherein the compressed gas power system further comprises a compressed carbon dioxide gas power system.

8. The unmanned aircraft system as recited in claim 1 wherein the propeller further comprises a pusher propeller.

9. The unmanned aircraft system as recited in claim 1 wherein the electric power system further comprises a battery system and an electric motor.

10. The unmanned aircraft system as recited in claim 1 further comprising a flight control system operable to control the compressed gas power system and the electric power system.

11. The unmanned aircraft system as recited in claim 10 wherein the flight control system is operable for autonomous control of the unmanned aircraft system using GPS waypoint navigation.

12. The unmanned aircraft system as recited in claim 10 wherein the flight control system is operable to communicate with a remote station for assisted manual navigation.

13. The unmanned aircraft system as recited in claim 1 further comprising a sensor system.

14. The unmanned aircraft system as recited in claim 13 wherein the sensor system further comprises a sensor array including one or more of an optical camera, a thermal camera, an infrared camera and a video camera.

15. The unmanned aircraft system as recited in claim 13 wherein the sensor system further comprises an intelligence, surveillance and reconnaissance payload.

16. The unmanned aircraft system as recited in claim 13 wherein the sensor system further comprises a GPS system.

17. An unmanned aircraft system having a vertical takeoff and landing flight mode and a forward flight mode, the unmanned aircraft system comprising:

an airframe;

a rotor assembly including at least two rotor blades having a tip jet, the rotor assembly rotatably coupled to the airframe;

a compressed gas power system operably associated with the tip jets, the compressed gas power system including a compressed gas canister and a valve for selectively releasing the compressed gas from the compressed gas canister;

a propeller rotatably coupled to the airframe;

an electric power system operably associated with the propeller;

a flight control system operable to control the compressed gas power system and the electric power system; and a sensor system coupled to the airframe;

wherein, in the vertical takeoff and landing flight mode, compressed gas from the compressed gas power system is discharged through the tip jets to rotate the rotor assembly to generate vertical lift; and wherein, in the forward flight mode, the electric power system drives the propeller to generate forward thrust and autorotation of the rotor assembly generates vertical lift.

18. The unmanned aircraft system as recited in claim 17 wherein the electric power system further comprises a battery system and an electric motor.

19. The unmanned aircraft system as recited in claim 17 wherein the flight control system is operable for one or both of autonomous control of the unmanned aircraft system using GPS waypoint navigation and communications with a remote station for assisted manual navigation.

20. The unmanned aircraft system as recited in claim 17 further comprising a sensor array including one or more of an optical camera, a thermal camera, an infrared camera, a video camera and an intelligence, surveillance and reconnaissance payload.

* * * * *